Figure 1:
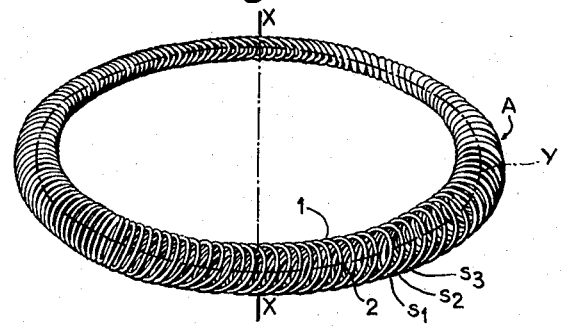

May 11, 1965  G. E. BRAM  3,183,010
REINFORCEMENT FOR SEALING ELEMENT AND SEALING ELEMENT
INCORPORATING SAID REINFORCEMENT
Filed Feb. 19, 1962  3 Sheets-Sheet 1

OLD PRACTICE

Georges Eugène BRAM
INVENTOR

BY J. Delattre-Seguy
ATTORNEY

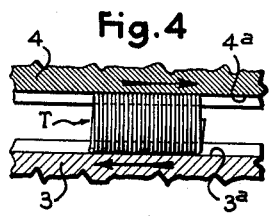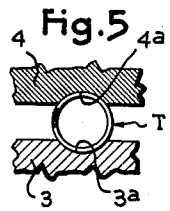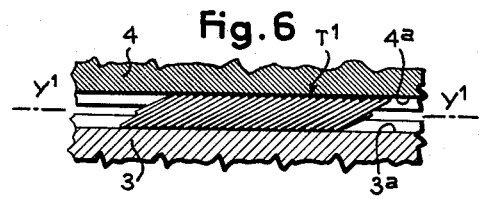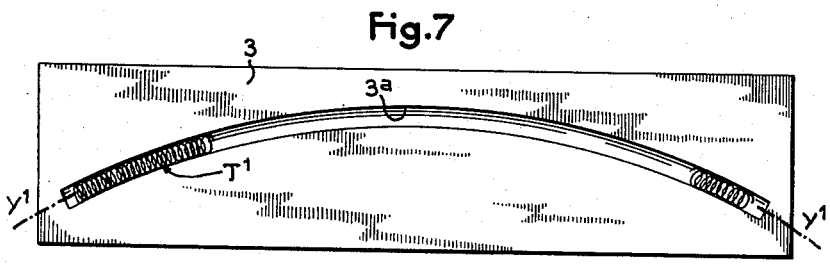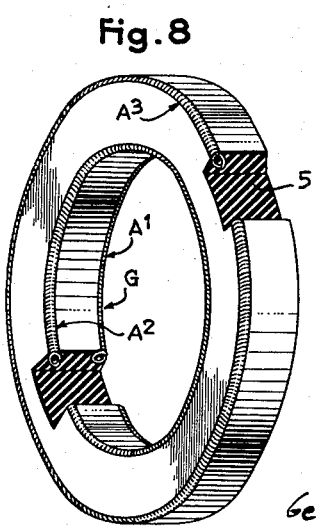

May 11, 1965
G. E. BRAM
3,183,010
REINFORCEMENT FOR SEALING ELEMENT AND SEALING ELEMENT INCORPORATING SAID REINFORCEMENT
Filed Feb. 19, 1962
3 Sheets-Sheet 3
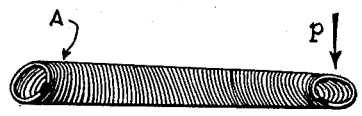
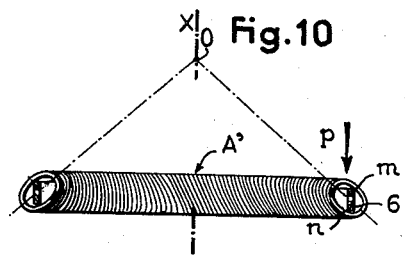
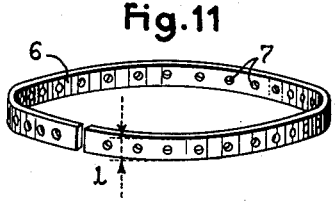
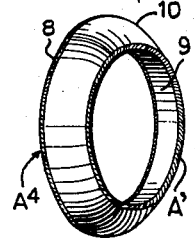
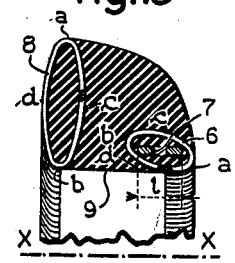
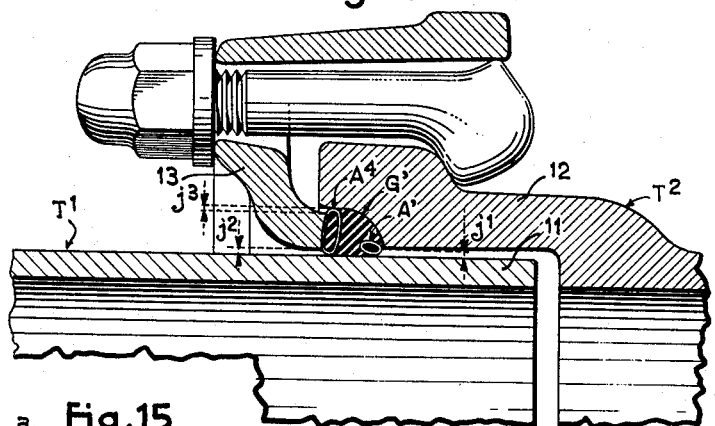
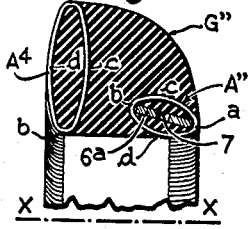
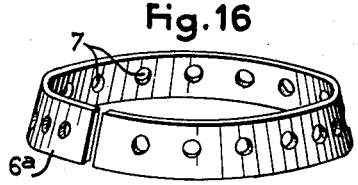
INVENTOR
Georges Eugène BRAM
BY
J. Delattre-Seguy
ATTORNEY

United States Patent Office 3,183,010
Patented May 11, 1965

3,183,010
REINFORCEMENT FOR SEALING ELEMENT AND SEALING ELEMENT INCORPORATING SAID REINFORCEMENT
Georges Eugène Bram, Pont-a-Mousson, France, assignor to Centre de Recherches de Pont-a-Mousson, Pont-a-Mousson, France, a French body corporate
Filed Feb. 19, 1962, Ser. No. 174,003
Claims priority, application France, Feb. 23, 1961, 853,680, Patent 1,289,608; Dec. 19, 1961, 882,479, Patent 1,289,608
13 Claims. (Cl. 277—235)

The present invention relates to annular sealing elements for pipe elements and the like having a socket, and in particular to elastic sealing elements for joints of the type in which the sealing element is compressed in a cavity between facing surfaces of the fitted together pipe elements.

A type of composite annular sealing element has already been proposed which is capable of resisting flow in the intervals between the elements united by the joint owing to provision of reinforcements each of which is constituted by a ring formed from a portion of metal wire which is wound in such manner as to form a succession of coils or turns and then bent and whose two ends are interconnected, this ring being embedded in the body of the sealing element so as to be flush with the outer face thereof.

In the known sealing elements of this type the reinforcements are constituted by sections of helical springs having coils which are identical, in contact with one another and circular in plan. Experience has shown that the anchoring of such reinforcement the plastic and/or elastic material of which said body is constituted penetrating very imperfectly the spring.

The applicant has already proposed in applicant's French Patent No. 1,169,444 of March 13, 1957, a composite sealing element in which the anchoring of the reinforcements is considerably improved owing to the fact that the adjacent coils or turns of the reinforcements are only partially superimposed, these coils having shapes and/or orientations which are periodically variable.

The object of the present invention is to obtain the same result by simpler means.

The invention provides an elastic reinforcement for a composite sealing element which reinforcement is hardly more complicated to produce than that of a conventional helical spring and permits an excellent anchoring thereof in the body of the sealing element. This reinforcement comprises a ring of metal wire so wound as to form a succession of oblique coils which are sloped on the axis of the winding, namely on the mean neutral circumference of the ring, in such manner that any two adjacent coils are offset from each other and partially spaced apart in two opposed regions whereas they are partially in contact in two other regions where they cross one another.

The invention also provides an annular and composite sealing element comprising at least one of such improved reinforcements disposed in such manner that the coils thereof are flush with the surface of the body of the sealing element in one of said regions in which the coils are in contact.

Owing to the fact that the identical and adjacent coils of this reinforcement are partially in contact and partially spaced apart, the contacting coil regions of the reinforcement and in particular that which is flush with the surface of the sealing element, constitute an obstacle to the flow of the plastic and elastic material of the body of the sealing element whereas in the spaced coils regions the reinforcement allows, during the moulding of said body, penetration of the mass of the material constituting said body and is consequently perfectly anchored in and partially covered with said material.

Further features and advantages of the invention will become apparent from the ensuing description, with reference to the accompanying drawings to which the invention is in no way limited.

Figure 2A:
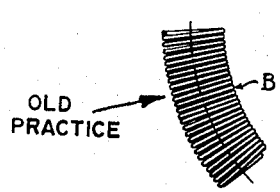
Figure 2:
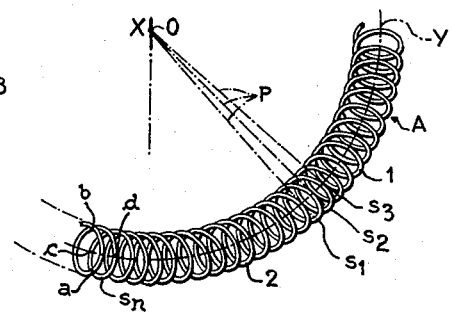
Figure 3:
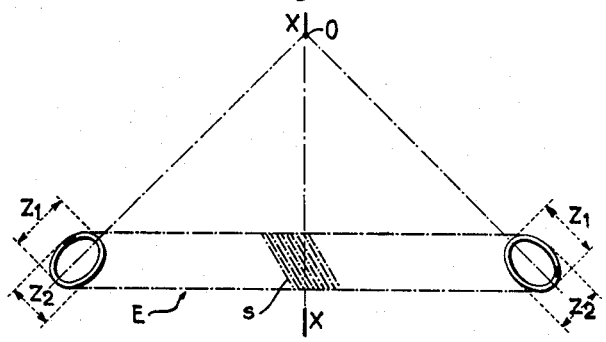

In the drawings:
FIG. 1 is a perspective view of a reinforcement improved in accordance with the invention;
FIG. 2 is a partial plan view thereof;
FIG. 2A is a partial plan view of a known reinforcement;
FIG. 3 is a diagrammatic diametral axial sectional view of the annular geometric envelope of the coils of the reinforcement;
FIGS. 4 and 5 are respectively longitudinal and cross-sectional views of a device of utility in the manufacture of the reinforcement;
FIG. 6 is a sectional view similar to FIG. 4 after the two dies of the device have been moved towards one another in an oblique direction;
FIG. 7 shows, on a scale smaller than that of FIGS. 4–6, the finished spring still engaged in one of the two dies;
FIG. 8 is a perspective view, with parts broken away, of a sealing element provided with reinforcements of the type shown in FIG. 1;
FIG. 9 is a diagrammatic elevational and axial diametral sectional view of a reinforcement devoid of a propping or spacer ring and deformed by a local pressure;
FIG. 10 is a diagrammatic view similar to FIG. 9 of the same reinforcement under the same conditions but provided with a spacer ring so that it is undeformed;
FIG. 11 is a perspective view of said spacer ring;
FIG. 12 is a perspective view of a sealing element according to the invention;
FIG. 13 is a partial radial sectional view, on a scale greater than that of FIG. 12, of the element shown in the latter figure;
FIG. 14 is a partial axial sectional view of a joint between pipe elements comprising said sealing element;
FIG. 15 is a view similar to FIG. 13 of a sealing element comprising a reinforcement having a part-conical spacer ring, and
FIG. 16 is a perspective view of the spacer ring shown in FIG. 15.

With reference to FIGS. 1 and 2, FIG. 1 shows in perspective a reinforcement A improved in accordance with the invention, whereas FIG. 2 shows in front elevation at A a portion of said reinforcement and by way of comparison, FIG. 2A shows at B, a portion of a known reinforcement.

The reinforcement A is annular, has an axis X—X and a mean circumference Y—Y. It is constituted by a metal wire 1 which is elastic in flexion, for example by a spring steel wire. This wire 1 is wound in such manner as to constitute a succession of coils or turns $s_1, s_2, s_3 \ldots$ and it is closed on itself by the welding together at 2 of the two ends of the wire 1. All the coils have a circular shape and are sloped or laid over one on top of the other so as to overlap. In other words, the coils are inclined on said means circumference Y—Y from the right to the left (clockwise direction) relative to the various meridian planes P of the reinforcement intersecting the axis X—X (FIG. 2).

In other words, the geometric envelope E (FIG. 3) of all the coils of the annular reinforcement thus constituted has any meridian section (that is, a section in an axial radial plane P) of elliptic type. FIG. 3 shows the two diametrally opposed elliptic meridian sections. All the elliptic meridian sections are orientated obliquely and in identical manner with respect to the axis X—X of the reinforcement, in that the prolonged major axes of all the sections intersect at O on this axis and form a cone having an apex O and an axis X—X.

Two consecutive coils are superimposed in arcuate portions $a$ and $b$ in the regions corresponding to the ends of the major axes $z_1$ of said elliptic meridian sections, but keep a rather wide free space on the two opposed portions $c$ and $d$ corresponding to the regions in the vicinity of the ends of the minor axes $z_2$ of said meridan sections. The width of said free space—which is about one millimetre in respect of coils five millimetres in diameter—can reach several millimetres in respect of coils twenty millimetres in diameter.

A conventional reinforcement is shown at B in FIG. 2A for purposes of comparison. As can be seen, the circular, unsloped coils having the same diameter of the reinforcement B are in contact along the whole of their perimeter and do not provide free passages.

In order to produce the reinforcement A, one could start with a rectilinear portion T of a conventional helical spring having contacting circular coils; the coils are sloped or laid over one on top of the other and then the portion T having the sloping coils is given a permanent arcuate shape, corresponding to the development in the flat state of the reinforcement, by bending this portion. Alternatively, one could start with an arcuate portion of a conventional helical spring having contacting circular coils the coils of which are merely sloped or laid over.

The coils of the original rectilinear or arcuate helical spring can be sloped one on top of the other by a permanent deformation between two dies 3 and 4 having recesses $3^a$, $4^a$ (FIGS. 4–6) which are rectilinear or arcuate (FIG. 7) and are moved towards one another and displaced simultaneously either by a relative translation in the case of a rectilinear portion or by a relative rotation along the median line $Y^1$—$Y^1$ (FIG. 7) in the case of an arcuate portion of spring.

In either case, it suffices to interconnect the two ends of the portion $T_1$ by welding to obtain the reinforcement A.

The permanent deformation or deformations can in particular be effected when hot, the elastic properties being restored to the reinforcement A by a hardening heat treatment after deformation.

FIG. 8 shows by way of example a sealing element G provided with sloped or obliquely disposed circular coils. Disposed in the ring 5 of elastic material—for example natural or synthetic rubber or plastic such as a superpolyamide or polyvinyl chloride—are three reinforcements $A^1$, $A^2$, $A^3$ disposed along its two inner edges and along one of its outer edges so as to be embedded in the ring with the surface of which they are flush in the regions where portions of their coils are superimposed, whereas the regions of the reinforcements where the coils are spaced the maximum distance apart are embedded in the ring, the material of the ring having easily penetrated the coils so as to fill the latter and thereby insure a perfect anchoring of the reinforcements.

The reinforcements A, above all after they have been coated by the ring material, are perfectly stable. However, if a reinforcement A before being coated is locally subjected to a slight pressure $p$ (as shown in FIG. 9) its coils are sloped or disposed obliquely in the region in which said pressure is exerted. They assume the normal position of equilibrium of a body having an elliptic section which always has a tendency to rest on the end of the minor axis of the elliptic section. This disadvantage can be avoided by completing the reinforcement as shown in FIG. 10.

Disposed in the reinforcement A' is a cylindrical spacer ring 6 which is shown in perspective in FIG. 11 and constituted by a steel strip bent on itself and perforated with apertures 7 spaced an equal distance apart. The width $t$ has a magnitude between the lengths of the minor and major axes of the elliptic meridian section of the geometric envelope of the coils of the reinforcement A'. It is passed through the interior of the coils of this reinforcement and thus constrains the coils to assume a diameter of magnitude between the lengths of the axes of the elliptic section. It serves as a supporting and guiding member for the coils and enables them to retain the initial orientation in the free state relative to the axis of revolution X—X of the reinforcement, by perfectly spacing or blocking the coils with respect to one another.

FIG. 10 clearly shows that the right hand coil on which the pressure $p$ is exerted cannot oscillate in the counter clockwise direction from its illustrated normal position owing to the fact that this reinforcement bears against the ring 6 at $m$ and $n$.

With such a spacer ring, even when the reinforcement $A^5$ is locally subjected to high pressure $p$ it cannot in any way become deformed in the region in which the pressure is applied.

With reference now to FIGS. 12 and 13 which show another sealing element G', the latter comprises a reinforcement $A^4$ having circular coils and devoid of a spacer ring. The annular envelope of this reinforcement $A^4$ has meridian elliptic sections whose major axis is equal to the radial thickness of the sealing element and this reinforcement is flush with the transverse face 8 of the element G' which face is very slightly curved. These portions $a$ and $b$ where the coils are superimposed are disposed in the edges that the transverse face 8 forms with the inner cylindrical face 9 and the outer face 10, which may be toric as shown, cylindrical or in the form of a truncated cone, whereas the portions $c$ and $d$ in which the coils are spaced apart are disposed in the middle of the transverse face 8.

The sealing element G' also has a reinforcement A' smaller than the reinforcement $A^4$. This reinforcement A' includes a spacer ring 6 and is disposed in the inner corner of the section of the element opposed to the corner in which the reinforcement $A^4$ is disposed.

The superimposed portions $a$ of the consecutive coils form the inner corner of the section of the sealing element whereas the spaced-apart portions $c$ and $d$ are within this section.

As can be seen in FIG. 14, the sealing element G' is employed in the assembly of a sealing joint of known type between two pipes $T^1$ and $T^2$. It is compressed between the male end 11 of the pipe $T^1$ and the socket 12 of the pipe $T^2$ by means of an annular clamping element 13. The reinforcements $A^4$ and A' prevent the flow of the element G' in the annular clearances $j^1$, $j^2$, $j^3$ between the pipes $T^1$ and $T^2$ and the clamping element 13 under the effect of the compression. In particular, the reinforcement $A^4$ forms a firm support face on the sealing element G' for this clamping element and prevents the formation of flow beads or rolls in said annular clearances. Consequently, the sealing element G' keeps its shape perfectly well and provides an excellent seal. It is easily mounted in such a joint since in the free state it remains flexible, since the reinforcements $A^4$ and A' are themselves flexible and can be compressed or, on the contrary, elongated depending on whether they are subjected to compressive centripetal radial forces or tensile centrifugal radial forces.

The moulding of the sealing element G' is easily accomplished owing to the properties of the reinforcements $A^4$ and A'. Thus the large crescent-shaped free spaces $c$, $d$ between the consecutive circular coils allow the injected hot moulding material to readily penetrate between the coils without solidifying on contact therewith, even if these reinforcements are cold. The apertures 7 in the spacer ring 6 facilitate the flow of the moulding material within the coils. Consequently, the reinforcements $A^4$ and A' are perfectly well embedded in the sealing element G' in the course of moulding and are therefore perfectly anchored therein. The reinforcement $A^4$ has no need for a spacer ring since its coils are held by the pressure of injection against the wall of the mould which forms the element G'; the coils of the reinforcement A', which are blocked in position by the spacer ring 6, retain their initial orientation in said mould without special precautions despite the high pressure of injection p exerted thereon.

In the modification shown in FIGS. 15 and 16, the sealing element G" comprises the reinforcement A⁴ without a spacer ring and a reinforcement A" in which the cylindrical spacer ring of the foregoing embodiment is replaced by a spacer ring 6ª having the shape of a truncated cone and provided with apertures 7 spaced an equal distance apart. The width of this part-conical ring is equal to the major diameter of the elliptic section of the annular reinforcement A".

Although specific embodiments of the invention have been described, many modifications and changes may be made therein without departing from the scope of the invention as defined in the appended claims.

Instead of being circular, the coils of the reinforcement could have an elliptic shape, which could be obtained by crushing the circular coils when forming the rectilinear portion of the initial spring.

The method of producing the reinforcement has been given merely by way of example.

The sealing element can have a sectional shape other than those shown in the drawings.

Further, the wire constituting the reinforcements can be covered with a film or coating of plastic or covered with a sleeve so as to avoid any electric contact between the assembled pipes.

Having now described my invention what I claim as new and desire to secure by Letters Patent is:

1. In an annular composite sealing element comprising a body of an elastomer reinforcement which is embedded in the body and comprises a ring structure having a circular neutral axis and consisting of a metal wire coiled in circular coils about said axis so that the ring structure has a succession of oblique coils, the coils sloping toward said axis in such manner that the ring structure has an elliptic meridian cross-sectional shape the major axis of which shape intersects the centre axis of the ring structure and that any two adjacent coils are offset from each other and partially spaced from each other in two opposite first regions of the coils and thereby permit an advantageous anchoring of the reinforcement in said body and cross each other and partially contact each other in two second regions of the coils and thereby prevent crep of said body in said second regions, said reinforcement further comprising a spacer ring embedded in said body and extending through the coils, whereby regions of the latter are supported and maintain their shape.

2. The sealing element as claimed in claim 1, wherein apertures are formed in the spacer ring.

3. The sealing element as claimed in claim 1, wherein the spacer ring has a substantially rectangular cross-sectional shape.

4. The sealing element as claimed in claim 3, wherein the spacer ring is cylindrical.

5. The sealing element as claimed in claim 3, wherein the spacer ring is in the shape of a truncated hollow cone.

6. Annular and composite sealing element comprising an elastic and pliable body and a reinforcement embedded in the body and in the form of a ring structure having a circular neutral axis and consisting of a metal wire coiled about said axis in such manner that the ring structure has throughout the circumferential extent thereof a succession of identical oblique coils which are sloped toward said axis and any two adjacent identical coils are offset from each other and partially spaced from each other in two opposite first regions of the coils and cross each other and partially contact each other in two second regions of the coils, said reinforcement being disposed in such manner that the coils of the reinforcement are flush with the surface of said body in one of said second regions of the coils, whereby creep of said body is resisted in said one of said second regions while the reinforcement is advantageously anchored in said body in said first regions of the coils.

7. Annular and composite sealing element comprising on the one hand an elastic and pliable body having a transverse bearing face and a cross-sectional shape having at least three radiused corners, and on the other hand, a first reinforcement and a second reinforcement both partially embedded in the body, each reinforcement being in the form of a ring structure having an axis of revolution and a circular neutral axis extending about said axis of revolution and consisting of a metal wire coiled about said neutral axis in such manner that the ring structure has a succession of oblique identical coils which have the same disposition relative to said axis of revolution and neutral axis and are sloped toward said neutral axis and any two adjacent identical coils are offset from each other and partially spaced from each other in two opposite first regions of the coils and cross each other and partially contact each other in two second regions of the coils, a portion of the first reinforcement being flush with said transverse bearing face and the second reinforcement including a spacer ring which extends through its coils and supports portions of the latter, the second reinforcement being located in one of said radiused corners, the two reinforcements being so disposed that the circular radiused edges of the sealing element corresponding to said radiused corners are constituted by the regions of the coils in which the coils contact each other and the portions of the reinforcements which are embedded in said body correspond to the regions in which the coils are spaced apart from each other, whereby the reinforcements reinforce said circular edges and are well anchored in said body.

8. A reinforcement for an annular and composite elastic sealing element and comprising a metal wire coil spring having an axis of revolution and a circular neutral axis extending about said axis of revolution, the spring being substantially flattened in a direction parallel with said axis of revolution so that the coils of the spring lie in planes that are oblique relative to said neutral axis and any two adjacent identical coils are off-set from each other and partially spaced from each other in two opposite first regions of the coils, said any two adjacent identical coils crossing each other and partially contacting each other in two second regions of the coils.

9. A reinforcement as claimed in claim 8, wherein said coils have an elongated substantially elliptic shape.

10. In an annular composite sealing element comprising a body of an elastic and pliable material, a reinforcing ring structure which is embedded in said body and has an axis of revolution and comprises a metal wire coil spring having a circular neutral axis extending about said axis of revolution and coils all having identical shapes and identical dispositions relative to said neutral axis and said axis of revolution, the spring in the entire circumferential extent thereof being partially flattened in a direction prallel with said axis of revolution so that all the coils of the spring are tilted over and are oblique relative to said neutral axis and any two adjacent identical coils are offset from each other and partially spaced from each other in two opposite first regions of the coils, said any two adjacent coils crossing each other and partially contacting each other in two second regions of the coils.

11. In an annular composite sealing element comprising a body of an elastomer, a reinforcement which is embedded in the body and has an axis of revolution and comprises a ring structure having a circular neutral axis extending about said axis of revolution and consisting of a metal wire coiled in identical circular coils about said neutral axis so that the ring structure has a succession of oblique coils which have identical dispositions relative to said axis of revolution and said neutral axis, the coils sloping toward said neutral axis in such manner that the ring structure has throughout the circumferential extent thereof an elliptic radial cross-sectional shape the major axis of which shape intersects said axis of revolution and that any two adjacent identical coils are offset from each other and partially spaced from each other in two opposite first regions of the coils and thereby permit an advantageous anchoring of the reinforcement in said body and cross each other and partially contact each other in two second regions of the coils and thereby prevent creep of said body in said second regions.

12. In an annular composite sealing element comprising a body of an elastically yieldable material, a reinforcement which is embedded in the body and comprises a ring structure having a circular neutral axis and an elliptic meridian cross-sectional shape throughout the circumferential extent of the ring structure and consisting of a metal wire coiled about said axis in such manner that the ring structure has a succession of identical oblique coils all of which are sloped toward said axis and any two adjacent identical coils are offset from each other and partially spaced from each other in two first regions of the coils located at the ends of the minor axis of said elliptic meridian cross-section and cross each other and thereby permit an advantageous anchoring of the reinforcement in said body and partially contact each other in two second regions of the coils located at the ends of the major axis of said elliptic meridian cross-section, and thereby prevent creep of said body in said second region, the major axis of the elliptic cross-sectional shape intersecting the axis of revolution of the sealing element and the ring structure.

13. The sealing element as claimed in claim 10, wherein said coils have an elongated substantially elliptic shape.

References Cited by the Examiner

UNITED STATES PATENTS

| | | | |
|---|---|---|---|
| 1,984,806 | 12/34 | Pfefferle | 277—235 |
| 2,325,556 | 7/43 | Taylor et al. | 277—235 |
| 2,417,390 | 3/47 | Winkeljohn | 277—235 |
| 2,610,846 | 9/52 | Hanna | 267—1.5 |
| 2,957,717 | 10/60 | Bram | 277—164 X |

LEWIS J. LENNY, *Primary Examiner.*

WALTER A. SCHEEL, EDWARD V. BENHAM,
*Examiners.*